US011875051B2

(12) United States Patent
Ghaly

(10) Patent No.: US 11,875,051 B2
(45) Date of Patent: Jan. 16, 2024

(54) CONTIGUOUS DATA STORAGE USING GROUP IDENTIFIERS

(71) Applicant: Microsoft Technology Licensing, LLC, Redmond, WA (US)

(72) Inventor: Mai Ghaly, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/843,785

(22) Filed: Jun. 17, 2022

(65) Prior Publication Data

US 2023/0409217 A1 Dec. 21, 2023

(51) Int. Cl.
*G06F 3/06* (2006.01)

(52) U.S. Cl.
CPC .............. *G06F 3/064* (2013.01); *G06F 3/061* (2013.01); *G06F 3/0616* (2013.01); *G06F 3/0679* (2013.01)

(58) Field of Classification Search
CPC ........ G06F 3/064; G06F 3/061; G06F 3/0616; G06F 3/0679
See application file for complete search history.

(56) References Cited

U.S. PATENT DOCUMENTS

| | | | | |
|---|---|---|---|---|
| 9,418,699 | B1* | 8/2016 | Gibbons | G11B 20/1217 |
| 2005/0050286 | A1* | 3/2005 | Crowley | G06F 11/2064 |
| | | | | 714/E11.107 |
| 2006/0236024 | A1* | 10/2006 | Saga | G06F 3/0625 |
| | | | | 711/100 |
| 2008/0313398 | A1* | 12/2008 | Koseki | G06F 3/0689 |
| | | | | 711/E12.001 |
| 2012/0124573 | A1* | 5/2012 | Mamtani | H04N 21/6377 |
| | | | | 718/1 |
| 2018/0307598 | A1* | 10/2018 | Fischer | G06F 3/0643 |
| 2019/0317889 | A1* | 10/2019 | Chang | G06F 3/064 |

* cited by examiner

*Primary Examiner* — Larry T Mackall
(74) *Attorney, Agent, or Firm* — Rainier Patents, P.S.

(57) ABSTRACT

The present concepts relate to contiguously writing data blocks of a data group in storage media in a one-step writing operation without defragmenting. A host may assign a group identifier to the data group, tag the data blocks in the data group with the group identifier, and send the data blocks to a storage controller. In turn, the storage controller may receive the data blocks that are tagged with the common group identifier, and contiguously write the data blocks in contiguous free space in the storage media. As such, reading the data group from the storage media may be performed faster than if the data group has been allowed to be written with fragmentation. The present concepts may also avoid the costs associated with a two-step writing operation that involves defragmenting.

20 Claims, 5 Drawing Sheets

400

| LBA | PBA |
|---|---|
| 0000 | 3641 |
| 0001 | 3642 |
| 0002 | 3643 |
| 0003 | 3644 |
| 0004 | 3645 |
| 0005 | 3646 |
| ⋮ | ⋮ |
| #### | #### |
| #### | #### |

| Group ID | Start PBA | # of PBAs |
|---|---|---|
| 000 | 3641 | 424 |
| 001 | 0278 | 36 |
| 002 | 4459 | 116 |
| 003 | 2875 | 1281 |
| 004 | 8645 | 995 |
| 005 | 5993 | 2150 |
| ⋮ | ⋮ | ⋮ |
| ### | #### | #### |
| ### | #### | #### |

FIG. 5

CONTIGUOUS DATA STORAGE USING GROUP IDENTIFIERS

BACKGROUND

The speed of writing data to storage and the speed of reading data from storage can vary depending on many different factors. The ability to read data quickly may be imperative to satisfactory performance of computerized operations.

SUMMARY

The present concepts relate to data management, including storing a group of associated data contiguously in physical media. Groups of associated data may be identified using group identifiers. Data blocks associated with a common identifier may be written together contiguously in physical storage in a one-step write operation that does not require defragmenting. Such a storage technique may prevent fragmentation of associated data, and thus avoid the need for defragmenting. Accordingly, the present concepts provide enhanced data read speeds for reading associated data that are stored contiguously. Additionally, the present concepts may also prolong the lifespan of storage media by reducing the number of write operations. Moreover, the present concepts relate to improved techniques for keeping track of the associated data, such that updates to the associated data can be written more quickly.

BRIEF DESCRIPTION OF THE DRAWINGS

The detailed description below references accompanying figures. The use of similar reference numbers in different instances in the description and the figures may indicate similar or identical items. The example figures are not necessarily to scale. The number of any particular element in the figures is for illustration purposes and is not limiting.

FIG. 4 illustrates an example logical-to-physical table, consistent with some implementations of the present concepts.

FIG. 5 illustrates an example group-to-physical table, consistent with some implementations of the present concepts.

DETAILED DESCRIPTION

Storage Media

An electronic system may include a host device that can read, write, delete, and/or modify data to and from a storage device. The storage device may include storage media for recording data. The storage media may include multiple divisions, and those divisions may include further divisions, i.e., nested divisions.

Figure 1:
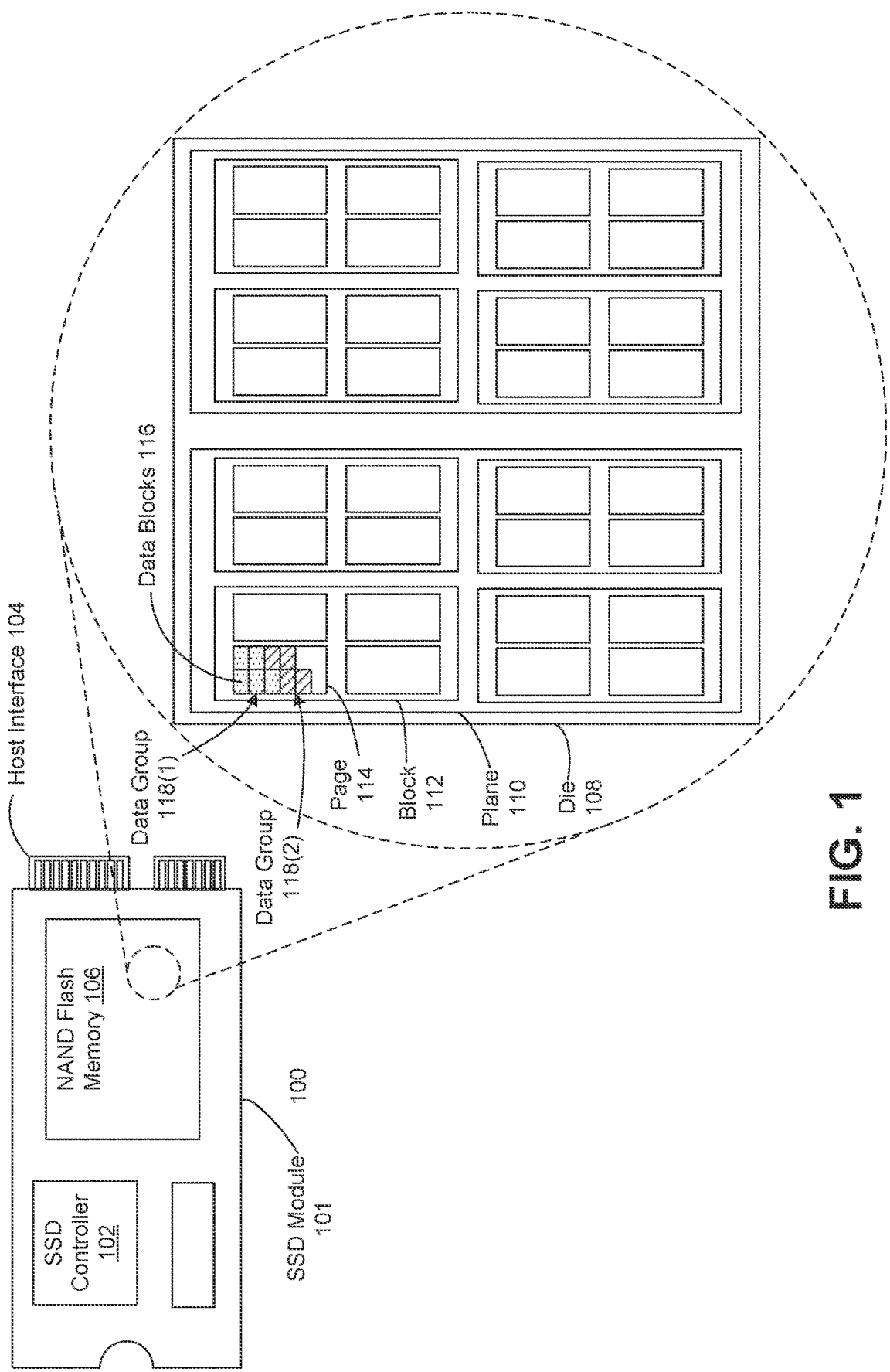
FIG. 1 illustrates an example storage device, consistent with some implementations of the present concepts.

FIG. 1 illustrates an example storage device 100, consistent with some implementations of the present concepts. In one implementation, the storage device 100 may include a solid state drive (SSD) module 101. The SSD module 101 may include an SSD controller 102, a host interface 104, and NAND flash memory 106. The SSD controller 102 may communicate with a host device via the host interface 104. The SSD controller 102 may also manage data storage in the NAND flash memory 106.

In one implementation, the NAND flash memory 106 may include nested divisions. For example, the NAND flash memory 106 may include one or more dies 108, each die may include one or more planes 110, each plane 110 may include one or more blocks 112, and each block 112 may include one or more pages 114, on which data may be stored. One page 114 may store 512, 2048, 4096, or 16384 bytes of data, or any other size of data. The number of storage media divisions (e.g., the dies 108, the planes 110, the blocks 112, and the pages 114) shown in FIG. 1 is for illustration purposes and is not meant to be limiting. For example, FIG. 1 shows only four pages 114 in each block 112, but a block 112 may include hundreds of pages 114. Various implementations of the present concepts may include storage media with different numbers of divisions, different levels of divisions, and/or different names of divisions.

Another example (not illustrated) of the storage device 100 may include a hard disk controller and a hard disk drive (HDD). The hard disk controller may communicate with a host device and manage data storage in the HDD. The HDD may include nested divisions of physical storage media. For example, the HDD may include one or more platters, each platter may include one or two sides, each side may include one or more zones, each zone may include thousands of tracks, each track may include thousands of sectors, on which data may be stored. One sector may store 512, 1024, or 2048 bytes of data, or any other size of data.

The storage device 100 may use one or more file systems to store and manage data. Example file systems may include file allocation table (FAT), extensible file allocation table (exFAT), new technology file system (NTFS), high performance file system (HPFS), or any other file systems.

Technical Problems

One technical problem associated with convention data storage techniques is data fragmentation. Typically, a host may manage data in the logical domain, whereas a storage controller may manage data in the physical domain. That is, the host neither understands nor sees the actual physical locations of data. Accordingly, even if the host commands the storage controller to store data (containing data blocks that belong together in the logical space), the storage controller may store the data blocks in a fragmented manner (i.e., separated from one another rather than being contiguous) in the physical space.

There are many reasons why the data blocks may be fragmented in the storage media. Conventionally, the storage controller does not know which data blocks are associated with which other data blocks. The host may be multi-tasking multiple processes concurrently and command the storage controller to write, delete, and/or modify data blocks that are related to one another and data blocks that are unrelated to one another all at the same time. In turn, the storage controller stores the data blocks where there is available space in the physical media without regard to whether the data blocks belong together or not.

For example, the host may be concurrently updating an operating system (OS) component, making a copy of a photo gallery, downloading two games simultaneously, emptying the recycling bin, etc. The storage controller may not know which read, write, delete, and replace commands are associated with which groups of associated data that correspond with one another. Furthermore, data that is written to the storage media may be later enlarged. For example, a document may be lengthened by adding more pages of text, or a game that was previously downloaded may be updated to a newer version that is larger than the original version, etc. If there is no empty space next to the previously stored data blocks in the storage media, then the storage controller may store the updated data blocks separated from the previously stored data blocks in the storage media, even if the updated data blocks and the older data blocks all belong together in the logical domain.

A major disadvantage of data fragmentation is slow read speed. Compared to reading contiguously stored data, reading fragmented data may take longer time. In the example of an HDD, it may take additional seek time to drive the spindle motor to rotate the platters, move the read/write heads on the actuator arms between the inner diameter and the outer diameter, and issue multiple input/output (I/O) requests to read data blocks that are scatters throughout multiple platters, multiple sides, non-contiguous tracks, non-contiguous clusters, and non-contiguous sectors. Although not as detrimental as HDDs, in the example of the SDD module 101, it may take additional seek time to activate and deactivate different dies for access and additional processing overhead to read data blocks that are scattered throughout multiple dies 108, multiple planes 110, multiple blocks 112, and non-contiguous pages 114.

Although data fragmentation and the resulting read latency may be tolerated for non-critical applications, data fragmentation may be a barrier to satisfactory execution of critical applications where fast read speeds are essential. For example, a high-end game installed on a game console may require fast read speeds to play the game without delay, lag, freezing, buffering, and/or jittering, etc.

Accordingly, conventional data management techniques may involve the process of defragmenting fragmented data in storage. Defragmentation is the process moving and reorganizing scattered data blocks that belong together to be physically stored contiguously and/or sequentially to eliminate or reduce the degree of fragmentation. Data blocks may belong together (i.e., be associated with or related to each other) if they are likely to be read together, for example, because they are part of a logical grouping of data. Defragmentation may be initiated manually (e.g., by a user), periodically (e.g., by a recurring schedule), or upon initial storage of data (i.e., a two-step process of storing and then defragmenting). Defragmenting may result in data blocks that will be read together to be stored contiguously (and even sequentially) with the least amount of gaps in between and/or the least amount of media divisions (e.g., different platters, sides, tracks, clusters, sectors, dies, planes, blocks, and pages) as possible. Therefore, defragmented data can be read at a much faster speed.

However, defragmentation has several technological drawbacks. First, defragmenting consumes limited resources, such as processing power and memory resources. Thus, the defragmenting process may slow down the host, thereby delaying other tasks that are running in parallel.

Second, defragmentation can take a long time to perform, depending on the degree of fragmentation and the speed of the storage device. For instance, the defragmenting process may consume so much of the host's resources that the host is rendered unusable for performing other tasks (particularly resource-intensive tasks) at the same time. Therefore, the user may have to wait until the defragmenting process completes before continuing to use the host for other purposes. For example, if a large game is being downloaded and stored fragmented, then a defragmentation task may be initiated, and the user may be forced to wait for the defragmentation task to complete before playing the game.

Third, defragmentation can shorten the lifespan of the storage device. In the case of HDDs, defragmentation would require additional movement of mechanical components, such as the actuator arm, spindle motor, etc., resulting in faster wear and/or earlier mechanical failures. This third drawback is even more pronounced in the case of SSDs that have limited endurance. Defragmentation would require additional write operations that could significantly shorten the lifespan of SSDs. Thus, there is a strong desire to reduce the number of write operations on SSDs while avoiding write-intensive processes, such as defragmentation.

In view of the above-discussed technical problems, there is a need for storing groups of associated data contiguously in physical storage media in the first instance without performing costly defragmentation that involves multiple write operations. Conventional data management techniques do not provide a way to contiguously store associated data blocks in a one-step write process.

Technical Solutions

The present concepts relate to data storage management involving a scheme for enforcing the contiguous storage of associated data blocks in physical storage media in a one-step write operation. In some implementations, a host may identify a group of data blocks as belonging together using a group identifier (ID), and a storage controller may ensure that data blocks associated with same group ID are written contiguously in the storage media in the first instance of writing. By writing associated data blocks contiguously in the first instance, the present concepts can enhance read performance without incurring the costs associated with defragmentation that involves multiple write operations.

Referring again to FIG. 1, one page 114 is illustrated as storing nine data blocks 116. In this example, the first five data blocks 116 that are shaded using dots may be part of a first data group 118(1), and the last four data blocks 116 that are shaded using diagonal lines may be part of a second data group 118(2). As shown in FIG. 1, the data blocks 116 belonging to the first data group 118(1) are stored contiguously without separation from each other (i.e., no physical gaps), and the data blocks 116 belonging to the second data group 118(2) are also stored contiguously without separation from each other. The number of data blocks 116 in each of the example data groups 118 is for illustration purposes and is not meant to be limiting. A data group may include any number of data blocks. Also, the number of data blocks 116 that can be stored in one page 114, as shown in FIG. 1, is also for illustration purposes and is not meant to be limiting. Depending on the storage media, media divisions, and file system formatting, the correspondence between a page and a data block may be one-to-one or one-to-many (i.e., one to any number).

Accordingly, the present concepts may enable the host to identify the data group 118 for contiguous storage, assign a group ID to the data group 118, tag the data blocks 116 in the data group 118 with the group ID, and command the storage controller to contiguously write the data blocks 116 in the physical media in a one-step write operation without defragmenting. Consistent with the present concepts, the group ID may enable the storage controller to be aware of which data blocks 116 belong together. In turn, the storage controller may organize the physical storage locations of the data blocks 116, such that the data blocks 116 that share the common group ID (i.e., belong to the same data group 118) are written contiguously for fast read performance. This implementation may avoid fragmentation of the data blocks 116, and thus render defragmentation unnecessary.

Furthermore, some implementations of the present concepts may involve the host keeping track of the correspondence between data groups 118 and group IDs and/or the storage controller keeping track of the correspondence between group IDs and either logical block addresses (LBAs) and/or physical block addresses (PBAs) of the stored data blocks 116. In one implementation, rather than creating a very large table that would have as many entries as there are LBAs (or PBAs), the storage controller may maintain a much smaller table that keeps track of the direct correspondence between the group IDs and the contiguous sets of PBAs. This smaller table may take up less storage space and allow much faster lookup.

Systems

Figure 2:
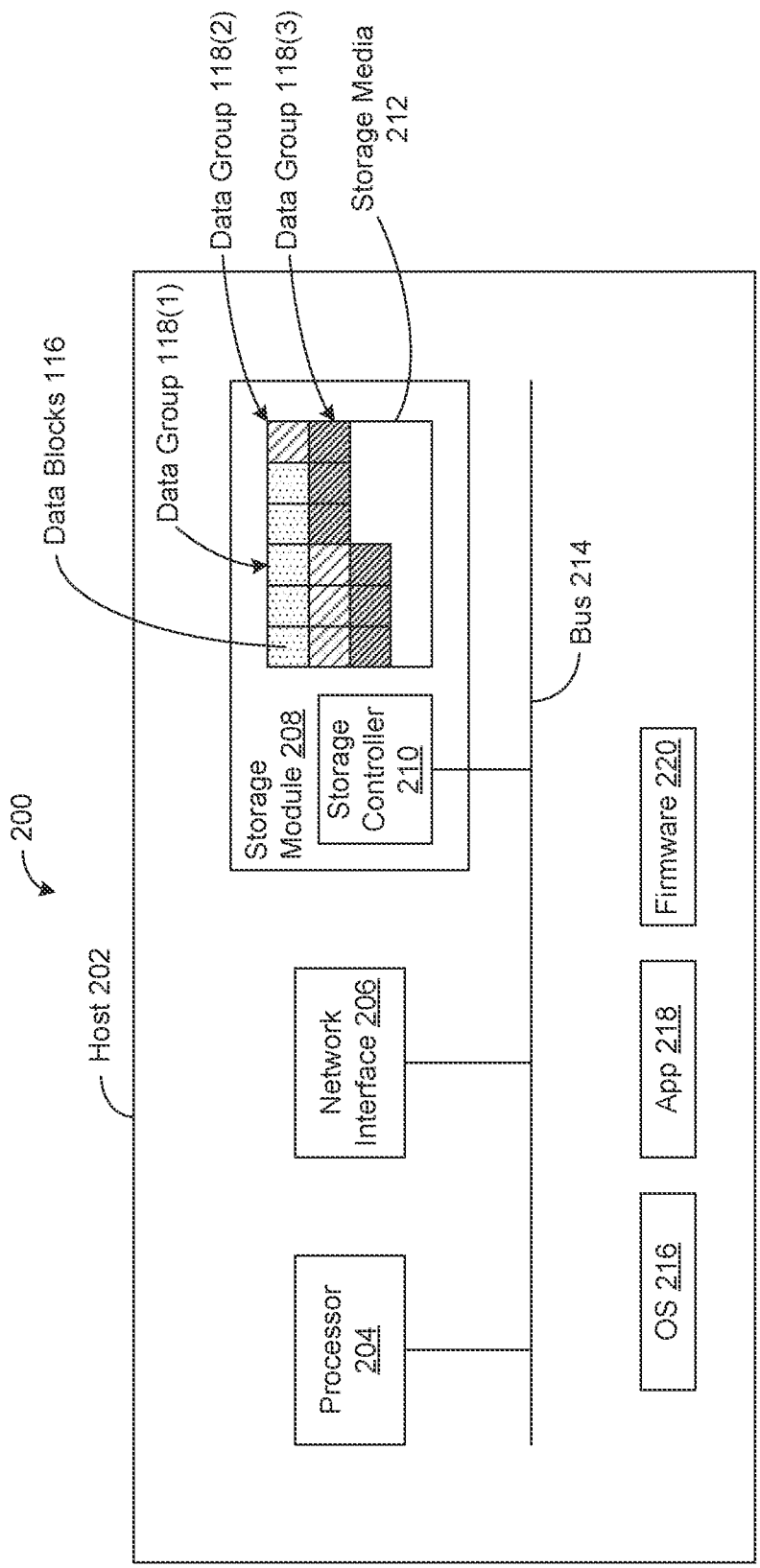
FIG. 2 illustrates an example system, consistent with some implementations of the present concepts.

FIG. 2 Illustrates an example system 200, consistent with some implementations of the present concepts. The system 200 may include a host 202. For example, the host 202 may include a personal computer (PC), desktop computer, server computer, mainframe computer, notebook computer, workstation, game console, game controller, cellular phone, smartphone, personal digital assistant (PDA), tablet or pad-type computer, mobile computer, camera, kiosk, appliance, virtual reality headset, smart device, Internet of things (IoT) device, vehicle, watch, wearable, set-top box, automobile entertainment or navigation console, printer, television, etc., and/or any of a myriad of ever-evolving or yet-to-be-developed type of electronic device that stores data. The host 202 in FIG. 2 is provided as an example to illustrate some implementations of the present concepts. Variations and alternative configurations are possible.

The host 202 may include one or more hardware components. For example, the host 202 may include a processor 204, a network interface 206, and a storage module 208. The storage module 208 may include a storage controller 210 and storage media 212. One or more of the hardware components in the host 202 may be connected by a bus 214 for communicating with each other. The host 202 may also include one or more software components. For example, the host may include an OS 216, an application 218, and firmware 220.

The processor 204 may include a central processing unit (CPU) for executing instructions, for example, machine-executable instructions that implement various aspects of the present concepts described herein. The CPU may be a single processor, a multi-processor, single-core units, and/or multi-core units. Although only one processor 204 is shown in FIG. 2 for simplicity, the host 202 may include multiple processors 204. Additionally or alternatively, the host 202 may include other types of processors 204, such as a graphics processing unit (GPU), an embedded microcontroller, a digital signal processor (DSP), etc. The GPU may execute instructions related to graphics and for displaying graphics on a display screen. In some implementations, the processor 204 may execute the OS 216, the application 218, and/or the firmware 220.

The network interface 206 may interface with one or more networks so that the host 202 may communicate with other computers, devices, accessories, and/or peripherals (e.g., a networked storage, a networked display, a networked printer, etc.). The network interface 206 may include wired network interfaces for connecting to wired networks (e.g., ethernet) and/or wireless network interfaces for connecting to wireless networks (e.g., Wi-Fi, Bluetooth, cellular, infrared, near-field communication, etc.).

The storage module 208 may store data, including programs, applications, operating systems, firmware, other machine-executable instructions, databases, and/or user-related data. The storage module 208 may be internal or external to the host 202. The storage controller 210 may include a storage processor, a microcontroller, a DSP, a system on chip (SOC), a printed circuit board (PCB), and/or a peripheral component interconnect (PCI) card. The storage controller 210 may execute firmware to communicate with the host 202 and manage data in the storage media 212. The storage media 212 may include computer readable storage media, such as magnetic disks, flash memory, removable memory, external memory, volatile or non-volatile memory, optical storage (e.g., compact disc (CD) or digital versatile disc (DVD)), and/or remote storage (e.g., cloud-based storage), among others. The storage media 212 may be any available media for storing information without employing transitory propagated signals. The storage media 212 may be used for implementing one or more aspects of the present concepts, including writing data contiguously and maintaining one or more lookup tables. The storage media 212 may also store instructions for implementing one or more aspects of the present concepts.

The bus 214 may include one or more signal lines that connect various components of the host 202 and provide interfaces for those components to communicate and transfer signals, commands, and/or data between each other. For example, the processor 204 may transmit data to the storage module 208 via the bus 214.

The OS 216 may include a collection of software that manages hardware components and/or the software components in the host 202 and/or provides services to the application 218. For example, the OS 216 may communicate with the storage module 208 to manage the storage of data. The application 218 may include a program designed to execute certain tasks, including managing data through the OS 216 and the storage module 208. The firmware 220 may include software that provide low-level control of hardware components in the host 202. Although FIG. 2 shows only one OS 216, one application 218, and one firmware 220 for simplicity, the host 202 may include multiple operating systems 216, multiple applications 218, and/or multiple firmware 220.

The host 202 may include additional hardware and/or software components (that are not illustrated in FIG. 2) of various types, depending on the nature, type, purpose, and/or function of the host 202. For example, the host 202 may include random access memory (RAM) for loading active data, programs, applications, operating systems, firmware, and/or other machine executable instructions from the storage module 208 or from other storage. The RAM may be volatile and/or non-volatile memory. The RAM may be used by the processor 204 to load, access, and manipulate instructions and/or data for implementing the present concepts. Furthermore, the host 202 may include one or more input/output (I/O) device interfaces for interfacing with one or more I/O devices, including peripherals, such as a keyboard, mouse, track pad, speaker, microphone, printer, scanner, facsimile machine, camera, remote control, joystick, game pad, stylus, touch screen, storage, etc. A user or a computer may provide input to the host 202 or receive output from the host 202 using one or more of these I/O devices.

The host 202 illustrated in FIG. 2 is merely one example. Many other types and configurations of the host 202 are possible. The host 202 may not include all or any of the components described above, and the host 202 may also include additional elements not explicitly described. The number and the types of hardware and/or software components in the host 202 in FIG. 2 are for illustration purposes and are not meant to be limiting.

The term "device," "computer," "computing device," or "controller," as used herein can include any type of device that has processing capability and/or storage capability. Processing capability can be provided by circuit logic or a hardware processor that can execute data in the form of computer-readable instructions to provide a functionality.

Generally, any of the functions described herein can be implemented using software, firmware, hardware (e.g., fixed-logic circuitry), or a combination of these implementations. The term "component," "module," or "logic" as used herein generally may represent software, firmware, hardware, circuitry, whole devices or networks, or a combination thereof. In the case of a software implementation of an aspect of the present concepts, these may represent program code that performs specified tasks when executed. The program code can be stored in one or more computer-readable memory devices, such as computer-readable storage media. The features and techniques of the component, module, or logic may be platform-independent, meaning that they may be implemented on a variety of commercial computing platforms having a variety of processing configurations.

Consistent with some implementations of the present concepts, the host 202 (for example, by running the application 218 and the OS 216 on the processor 204) may acquire data from an internal or external source for storage in the storage module 208. For instance, the host 202 may download a game from the Internet via the network interface 206 or copy a movie from a DVD in a DVD drive to the storage module 208.

In some implementations, the host 202 may determine one or more groups of associated data, for example, based on a likelihood that each group of associated data would be read from storage together. For instance, a game that would be read from storage and played may constitute a first data group, an application that may be read from storage and executed may constitute a second data group, and a spreadsheet file that may be read from storage and opened may constitute a third data group. One data group may include any number, type, and/or format of files, folders, databases, structures, etc., that the host 202 may logically group together for contiguous storage to enhance read performance.

In some implementations, the host 202 may assign group IDs to the data groups. That is, each data group may be assigned a unique group ID to distinguish each data group from one another. Following the above example, the first data group including the game may be assigned a first group ID, the second data group including the movie may be assigned a second group ID, and the third data group including the spreadsheet file may be assigned a third group ID.

In one implementation, the host 202 may leverage the Streams directives of the non-volatile memory express (NVMe) protocol and assign unique Stream IDs to the data groups. The Streams directive type was intended to be used in, for example, enterprise applications involving multiple CPUs and/or multiple storage controllers so that the I/O data accessed and stored by different CPUs and/or different storage controllers could be managed separately. For example, the Streams directives could be used in NVMe communications among multiple hosts sharing the same storage having one storage controller so that data associated with each host would be separated from data associated with other hosts. That is, each CPU in the multiple hosts could be assigned its own Stream. However, the present concepts may repurpose the Streams directives type (with some modifications) or use any other means of identifying associated data groups and distinguishing different data groups.

In some implementations, the group IDs may be sequential numbers, random unique strings (e.g., a nonce), guaranteed unique identifiers (e.g., globally unique identifiers (GUIDs)), or any other type of unique identifiers. In one implementation, the host 202 may keep track of the correspondence between the group IDs and the data groups. For example, the host 202 may maintain a table, a linked list, a database, or any other data structure that includes the assignment of group IDs to the data groups. Therefore, the host 202 may keep track of which group IDs have been assigned to which data groups as well as which group IDs are available to be assigned to new data groups.

In some implementations, to manage a data group, the host 202 (e.g., the OS 216 running on the processor 204) may break up the data group into multiple data blocks or any other unit of data chunks, such as data fragments, data segments, data extents, etc. The OS 216 of the host 202 may keep track of the data blocks in the logical space by assigning a unique LBA to each data block. The OS 216 may later recall specific data blocks from the storage module 208 by referencing the corresponding LBAs. The OS 216 may not know the actual physical locations of specific data blocks in the storage media 212.

In some implementations, to store data groups, the OS 216 may send the data groups to the storage controller 210 to be written to the storage media 212. In one implementation, the OS 216 may send group metadata about the data groups to the storage controller 210. The group metadata may include information about the data groups that the storage controller 210 can use to manage the storage of the data groups. For example, the group metadata may include the number of data groups (i.e., the number of group IDs) that will be sent for storage, the size of all the data in a particular data group, the number of data blocks in a particular data group, or any other information that the storage controller 210 may use to manage the storage of the data groups. In one implementation, the group metadata may include a maximum size and/or a minimum size that the storage controller 210 may use for allocating enough storage space for a particular data group. For example, the maximum size and the minimum size of a data group may allow some degree of margin for future updates to the data group that may enlarge or shrink the actual size of the data group. Alternatively, the minimum size may indicate the smallest size of a set of data blocks that should be stored contiguously in order to not affect the performance of reading the data group fast enough, in case the entire data group cannot be stored contiguously due to lack of a large enough free space in the storage media 212. The group metadata may be sent by the OS 216 to the storage controller 210 either before or along with the first data block that is sent to the storage controller 210.

In some implementations, the OS 216 may send block metadata about data blocks to the storage controller. For example, the OS 216 may append, package, or wrap the block metadata to each data block (i.e., the payload) that is sent to the storage controller 210. In one implementation, the block metadata may include, for example, the LBA of the data block, the size of the data block, the group ID to which the data block belongs, control data, error detection data, and/or sequencing data, etc. Accordingly, each data block may be tagged with its associated group ID.

Consistent with some implementations of the present concepts, the storage controller 210 may receive the data blocks as well as the block metadata and/or group metadata. The storage controller 210 may use the group metadata and/or the block metadata to find available space, find the optimal space, and/or make room in the storage media 212 for writing the data blocks contiguously in the first instance so as to avoid the need for defragmenting after the initial write operations. For instance, the storage controller 210 may find sufficiently large contiguous free space on the storage media 212 to contiguously store all the data blocks for the particular data group. For example, the storage controller 210 may use the actual size, the maximum size, and/or the minimum size of the data group included in the group metadata to determine how much free space to allocate to the data group. In one implementation, the storage controller 210 may add additional padding to the size of memory space allocated to the data group. In one implementation, the group metadata (e.g., the number of data blocks) and/or the block metadata (e.g., the sequencing data) may also allow the storage controller 210 to know when the transfer (i.e., the receipt) of data blocks for a particular data group completes.

Consistent with the present concepts, the storage controller 210 may write the data blocks having the same group ID contiguously in the storage media 212. In some implementations, the data blocks having the same group ID may also be written sequentially for even faster read speed. Unlike conventional data management, which would allow data blocks to be written with fragmentation in the first instance and then later moved around during defragmentation, the present concepts may enforce the contiguous writing of the data blocks in the first instance. Contiguous storage of the data blocks in the same data group may span multiple media divisions (e.g., multiple pages, blocks, planes, dies, sectors, clusters, tracks, sides, and platters) in the storage media 212. In one implementation, the storage controller 210 may be configured to contiguously write data blocks within the same data group with the least number of media divisions as possible. For example, although a data group may be written in a super block that spans multiple dies, if a data group is small enough to fit inside a single die, then contiguously writing the data group within one die (FIG. 1, 108) would be preferable to spanning the data group across multiple dies (i.e., crossing over the die boundaries) for faster read performance. Moreover, the storage controller 210 may be configured to keep all data blocks belonging to the same data group (i.e., associated with the same group ID) contiguously and/or sequentially in the storage media 212 even if the data blocks are shuffled around during any background maintenance operations.

In the example illustrated in FIG. 2, fifteen data blocks 116 may be stored in the storage media 212. The first five data blocks 116 that are shaded using dots may be part of the first data group 118(1) (e.g., the game) and may be tagged using the first group ID, the middle four data blocks 116 that are shaded using wide-spaced lines may be part of the second data group 118(2) (e.g., the movie) and may be tagged using the second group ID, and the last six data blocks 116 that are shaded using narrow-spaced lines may be part of the third data group 118(3) (e.g., the spreadsheet) and may be tagged using the third group ID. As shown in FIG. 2, the data blocks 116 in each of the three data groups 118 may be physically stored contiguously without fragmentation. Although FIG. 2 shows only fifteen data blocks 116 in three data groups 118 and does not show any media divisions in the storage media 212 for simplicity and illustration purposes, the number of data blocks 116, the number of data groups 118, and the number and levels of media divisions can vary greatly.

In one implementation, the storage controller 210 may keep track of the physical locations of the data blocks 116 in the physical space by assigning PBAs to each of the data blocks 116. Furthermore, the storage controller 210 may keep track of the correspondence between the LBA and PBA of each data block 116, which will be explained further in connection with FIG. 4 below. Additionally, the storage controller 210 may keep track of the correspondence between the group IDs and either the LBAs and/or the PBAs of the data blocks 116, which will be explained further in connection with FIG. 5 below.

In some scenarios, the host 202 may acquire an update to an old data group that is already contiguously stored in the storage media 212. For example, the host 202 may download an updated version of an old game that is already stored in the storage media 212 or download additional new photos for an old gallery that is already stored in the storage media 212. In one implementation, the same group ID that is already assigned to the older data group that is being updated may be assigned also to the updated data group by the OS 216 of the host 202. This assignment may ensure that the updated data group will be stored contiguously in the storage media 212 with the old data group. The OS 216 may send new data blocks, which are part of the update, along with (i.e., tagged with) the associated group ID to the storage controller 210. In turn, the storage controller 210 may determine at which physical locations (i.e., PBAs) the old data blocks for the same group ID are stored in the storage media 212, and store the new data blocks contiguously with the old data blocks. Depending on the type of update, the new data blocks may be appended to the old data blocks in the adjacent free space that is available (e.g., the padding space) and/or the new data blocks may replace (via read, modify, and write operations) all or some of the old data blocks. Accordingly, the end result may be that all data blocks (both old and new) within the data group are stored contiguously in the storage media 212 for improved read performance. In some implementations, the sequential order of the data blocks within the data groups may be maintained after the update is written to the storage media 212.

Data

Figure 3:
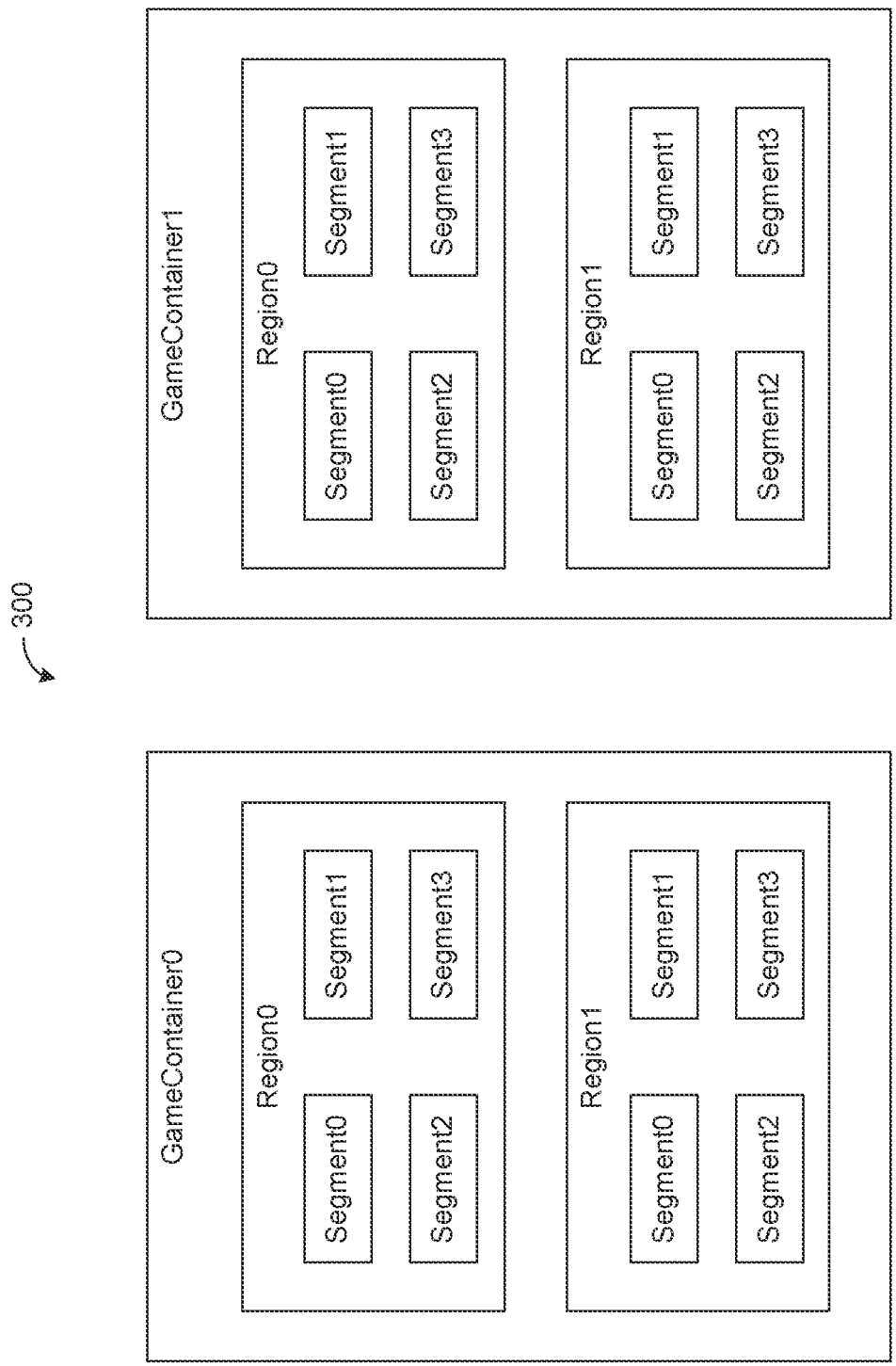
FIG. 3 illustrates example data, consistent with some implementations of the present concepts.

The storage device 100 in FIG. 1 and/or the system 200 in FIG. 2 can implement the present concepts to contiguously store any kind of data, particularly any data that can benefit from high read speeds. One example type of data will be described in connection with FIG. 3, which illustrates example data 300, consistent with some implementations of the present concepts. In this example, the data 300 may include game data.

The data 300 may include one or more data divisions and/or one or more nested levels of data divisions. For example, in one implementation, the data 300 may include two game containers GameContainer0 and GameContainer1. A game container may be used by a game developer to hold all game data related to a particular game title. For example, GameContainer0 may hold game data for the game Minecraft®, and GameContainer1 may hold game data for the game Halo®.

In one implementation, each game container may include one or more regions of game data. For example, GameContainer0 may include Region0 and Region 1. The regions in a game container may represent logical divisions of game data determined by the game developer. For example, a game container may include one or more regions of game data for various geographical regions and/or languages, such as a region for United States, a region for China, a region for France, and so on. As such, users in the United States, China, France, or a different geographical region may download a specific region of game data appropriate for each particular user so that the downloaded game region will include the appropriate language (e.g., text, names, menus, graphics, and audio in English, German, Russian, or Japanese). Depending on the game developer's choice of divisions of game data, a game container may include a region of game data that is common to some or all geographical regions and/or languages.

Additionally, or alternatively, a game container may include one or more regions for various versions and/or generations of game data. For example, a game container may include a region for the original version of the game, and one or more additional regions for subsequent updated versions of the game. Depending on the game developer's choice of divisions of game data, a game container may include a region of game data that is common to some or all versions of the game.

In one implementation, each region may include one or more segments of game data. For example, Region0 may include Segment0, Segment1, Segment2, and Segment3. The segments in a region may represent another nested level of logical divisions of game data determined by the game developer. For example, a region may contain multiple segments of game components or game modules, etc. For instance, a segment may include one or more game files (e.g., executable files, audio files, texture files, or dynamic link libraries (DLLs)) or one or more folders of related files.

In one implementation, a host may obtain all or part of the data 300. For example, the host may download Region1 pertaining to a particular version and a particular geographical region for storage in storage media so that a user can play the game. In this example, it may be imperative that the game data in Region1 (including all segments within Region1) be read from the storage media at a high speed in order to play the game without interruption. Alternatively, in another example, it may be imperative that the game data in one segment (e.g., Segment3) be read at a high speed to play the game smoothly. Therefore, the host may determine that a group of data (e.g., Region1 or Segment3) should be stored contiguously in the storage media and assign a unique group ID to the data group. For example, to store Region1 contiguously in the storage media, the host may assign an available group ID to Region1 (i.e., to all segments in Region1 and to all data blocks in Region1). In one implementation, an OS of the host may download Region1 in smaller data blocks (e.g., each segment inside Region1 may be further broken down into smaller data blocks) and append metadata (including the group ID) to each data block. Alternatively, the game containers, the regions, and/or the segments may already include associated GUIDs that the host can use as a unique group ID. Consistent with the present concepts, a storage controller may ensure that all of the data blocks within the data group having the same group ID (e.g., Region1 including all the segments and all data blocks therein) are written contiguously in the first instance in the storage media for enhanced read performance.

As mentioned above in connection with FIG. 2, the OS of the host may keep track of the correspondence between group IDs and data groups. Therefore, the OS may ensure that each data group is assigned a unique group ID, there are not duplicate group IDs assigned to different data groups, and group IDs that are released (e.g., from data deletions) become available for reassignment to new data groups.

In one implementation, sets of group IDs may be created that map to corresponding sets of data groups. For example, an NVMe Stream group may be created for each game container so that a one-to-one, Stream-to-region mapping may be made between a group of Streams and a group of regions in a game container. This implementation may help reduce the number of times the OS has to lookup group IDs.

As mentioned above, the example data 300 in FIG. 3 is merely one example of various of types of data that can be used with the present concepts. The names of the data divisions, the number of data divisions, and the number of nested levels of data are all for illustration purposes and are not meant to be limiting. A different type of data (e.g., a database, a movie, a photo gallery, an OS, an application, a service, a virtual storage drive image, a virtual machine image, a virtual library, etc.) that may be used with the present concepts may have no divisions or different divisions than the ones illustrated in FIG. 3. Also, various portions of such data or the entirety of such data may be important to be read quickly from storage, which may therefore determine the groupings of data for contiguous storage.

Tables

FIG. 4 illustrates an example logical-to-physical (L2P) table 400, consistent with some implementations of the present concepts. As mentioned above in connection with FIG. 2, a storage controller may keep track of the correspondence between the LBAs and the PBAs of data blocks. In one implementation, the storage controller may create and maintain the L2P table 400. In this example, the L2P table 400 may include two columns: one column for LBAs and another column for PBAs. As such, each entry (or each row) in the L2P table 400 may reflect the correspondence between the LBA and the PBA of a single data block stored in storage media. Thus, the number of rows in the L2P table 400 may depend on the number of data blocks stored in storage media.

The LBAs may be created and used by an OS (and applications) in a host, which may address the data blocks in the logical domain. The PBAs may be created and used by the storage controller, which can address data blocks by their physical location address in the storage media. Thus, the storage controller may know both the LBA and the PBA of each data block. Accordingly, the L2P table 400 may be used to lookup or translate between the LBA and the PBA of a data block.

In one implementation, whenever the storage controller writes, deletes, moves, or replaces data blocks in the storage media (either due to requests from the host or for maintenance tasks), the storage controller may modify the L2P table 400 by adding, modifying, or deleting entries in the L2P table 400.

Furthermore, the L2P table 400 may be referenced when data is being read from the storage media. For example, the host may request certain data from the storage controller by addressing the requested data blocks by their LBAs. In turn, the storage controller may reference the L2P table 400 to determine at which physical locations (i.e., which PBAs) the data blocks are located in the storage media.

Consistent with the present concepts, the set of PBAs that correspond to a set of LBAs that are part of a particular data group may represent contiguous storage space (e.g., consecutive PBAs). For example, a set of LBAs that constitute a region of a game container may correspond to a set of contiguous PBAs in the L2P table 400.

The L2P table 400 shown in FIG. 4 is a simplified example that is provided for illustration purposes and is not meant to be limiting. Many different variations are possible. For example, the LBAs and/or the PBAs may have a numerical format, a hexadecimal format, or any other value format. The number of digits and/or the number of bits allocated to the LBAs and/or the PBAs can vary depending on need, usage context, and the size of the storage media. The left and right columns may be swapped. The LBAs and/or the PBAs need not be stored in sequential order. The number of rows (hence, the number of LBA-to-PBA correspondences) may vary greatly. For example, the L2P table 400 for a terabyte (TB) of data stored in the storage media that has been formatted to use NTFS having a 4 kilobyte (KB) block size may include around 250 million LBA-to-PBA correspondence entries. Alternatively, the same information in the L2P table 400 may be stored using other data structures besides tables.

FIG. 5 illustrates an example group-to-physical (G2P) table 500, consistent with some implementations of the present concepts. As mentioned above in connection with FIG. 2, the storage controller may keep track of the correspondence between the group IDs assigned to data groups and either the LBAs or the PBAs of data blocks. One inefficient way to keep track of this information would be to create and maintain a large group-to-logical (G2L) table (e.g., a Stream-to-LBA table) that includes the correspondence between the group IDs and the LBAs of data blocks. However, the G2L table would include an entry (or a row) for every data block, which can be very many rows (e.g., 250 million rows for a TB of data as demonstrated above in connection with FIG. 4). Such a large table not only takes up a lot of storage space but also takes a long time to perform a lookup.

Instead, consistent with the present concepts, the storage controller may keep track of the correspondence between the group IDs and PBAs of data groups using the G2P table 500, which would be much smaller than the G2L table. Because the data blocks belonging to the same data group are stored contiguously in the physical storage media and thus correspond to consecutive PBAs, the G2P table 500 need not include an entry for the PBA of every data block. Instead, as shown in FIG. 5, the G2P table 500 may include one column for the group IDs of data groups, two columns for the ranges of consecutive PBAs, and a row for each data group. In one implementation, the two columns for the ranges of consecutive PBAs may be identified by the starting PBAs and the total numbers of PBAs, as shown in FIG. 5. Alternatively, the two columns for the ranges of the consecutive PBAs may be identified by the starting PBAs and the ending PBAs. With either setup, not every PBA of every data block needs an entry in the G2P table 500. Rather, the G2P table 500 may include an entry (or a row) for each group ID. Accordingly, because the number of data groups is very much smaller than the number of data blocks, the G2P table 500 may be much smaller than the G2L table. The smaller G2P table 500, therefore, may take up less storage space and enable much faster lookups.

In one implementation, the storage controller may create and maintain the G2P table 500. Whenever the storage controller writes a new data group to the storage media, the storage controller may add a new entry in the G2P table 500 by adding the group ID, the starting PBA, and the number of PBAs for the new data group. Furthermore, whenever the storage controller, writes, deletes, moves, or replaces data blocks in the storage media (either due to requests from the host or for maintenance tasks), the storage controller may modify the G2P table 500 by modifying or deleting entries in the G2P table 500.

In one implementation, when the host sends a data group to the storage controller, the host may indicate to the storage controller whether the data group (and the associated group ID) is new or an update. Because the host maintains a list or a table of group IDs and corresponding data groups, the host may know whether a particular data group (and the corresponding group ID) is being sent to the storage controller for the first time or not. For example, the host may send a flag to the storage controller indicating whether the data group is being stored in the storage media for the first time or alternatively that this is an update to an old data group that is already stored in the storage media.

Alternatively, in another implementation where the host does not indicate to the storage controller whether a particular data group is new or an update, the storage controller may reference the G2P table 500 to make this determination. For example, when the storage controller receives from the host a command to store a data group along with a group ID, the storage controller may check whether the group ID already exists in the G2P table 500. If the group ID does not exist in the G2P table 500, then the storage controller may determine that the data group is being newly stored in the storage media (i.e., for the first time) and find available free space in the storage media to store the data group. Then, the storage controller may add a new entry in the G2P table 500 that specifies the group ID and the set of contiguous PBAs associated with the new data group. The storage controller may also add new entries in the L2P table 400 for the LBAs and the PBAs of the data blocks in the new data group.

Alternatively, if the group ID already exists in the G2P table 500, then the storage controller may determine that the host has sent an update of the old data group that is already stored in the storage media. The storage controller may reference the G2P table 500 to determine the set of consecutive PBAs (i.e., the contiguous physical storage locations in the storage media) of the old data group. Then, the storage controller may perform a reverse lookup of the L2P table 400 to find the set of LBAs that correspond to the set of PBAs associated with the group ID. Accordingly, the storage controller can determine, based on whether the LBAs corresponding to the data blocks of the updated data group already exists in the L2P table 400, whether the updated data group that was received from storage included new data blocks and/or replacement data blocks. Where the host sent replacement data blocks having LBAs that already exists in the L2P table 400, the storage controller may overwrite (i.e., replace by read, modify, and write operations) the old data blocks with the replacement data blocks at the same PBAs that stored the old data blocks. Where the host sent new data blocks having LBAs that are not in the L2P table 400, the storage controller may write the new data blocks contiguously with old data blocks in the same data group that share the common group ID. The new data blocks may be written in available free space next to the old data blocks, for example, in the padding space. The new data blocks may be written contiguously in the first writing instance using a one-step writing operation without needing to defragment the new data blocks using a two-step writing operation. The storage controller may update the entry in the G2P table 500 for the group ID by modifying the set of consecutive PBAs. The storage controller may also modify the L2P table 400 by adding new entries for the new data blocks.

In one implementation, the storage controller may determine the LBAs that correspond to a particular group ID by first referencing the G2P table 500 to identify the set of PBAs that correspond to the group ID and then referencing the L2P table 400 to identify the set of LBAs that correspond to the set of PBAs. Accordingly, the storage controller may use the much smaller G2P table 500 and perform a reverse lookup of the L2P table 400, rather than using the much larger G2L table discussed above. Because the set of PBAs for the particular group ID may be consecutive and represent only a fraction of the entire L2P table 400 (i.e., much smaller space), this reverse lookup of the L2P table 400 should be much faster than using the G2L table. Consistent with the present concepts, avoiding the slow lookup of the G2L table should substantially increase the speed of writing updates to data groups.

In some implementations, the L2P table 400 and the G2P table 500 may be used by the storage controller to lookup the group ID associated with a particular LBA. For example, the storage controller may scan and find an LBA (or a group of LBAs) that is marginal and decide to move it to a different physical location. Before moving the marginal LBA, the storage controller may determine whether the marginal LBA belongs to a data group. If the marginal LBA belongs to a data group, then the storage controller may move the entire data group to maintain physical contiguity of the data blocks in the data group. To determine the logical-to-group correspondence without the G2L table, given the particular LBA, the storage controller may reference the L2P table 400 to determine the PBA that corresponds to the particular LBA. Then, the storage controller may reference the G2P table 500 to determine the group ID that corresponds to the PBA.

As mentioned above, if a data group is deleted from the storage media, the storage controller may remove the entries in the G2P table 500 and the L2P table 400 related to the deleted data group. Accordingly, the storage controller may release the group ID that was associated with the deleted data group. In turn, the host may free the group ID to be available for reassignment to a different data group in the future.

The G2P table 500 shown in FIG. 5 is a simplified example that is provided for illustration purposes and is not meant to be limiting. Many different variations are possible. For example, the group IDs may have a numerical format, a hexadecimal format, or any other value format. The number of digits and/or the number of bits allocated to the group IDs and/or the sets of PBAs can vary depending on need, usage context, and/or the size of the storage media. The left, middle, and right columns may be switched in any order. The group IDs and/or the starting PBAs need not be stored in sequential order. The number of rows (hence, the number of group-to-PBA correspondences) may vary greatly. The same information in the G2P table 500 may be stored using other data structures besides tables.

Processes

Figure 6:
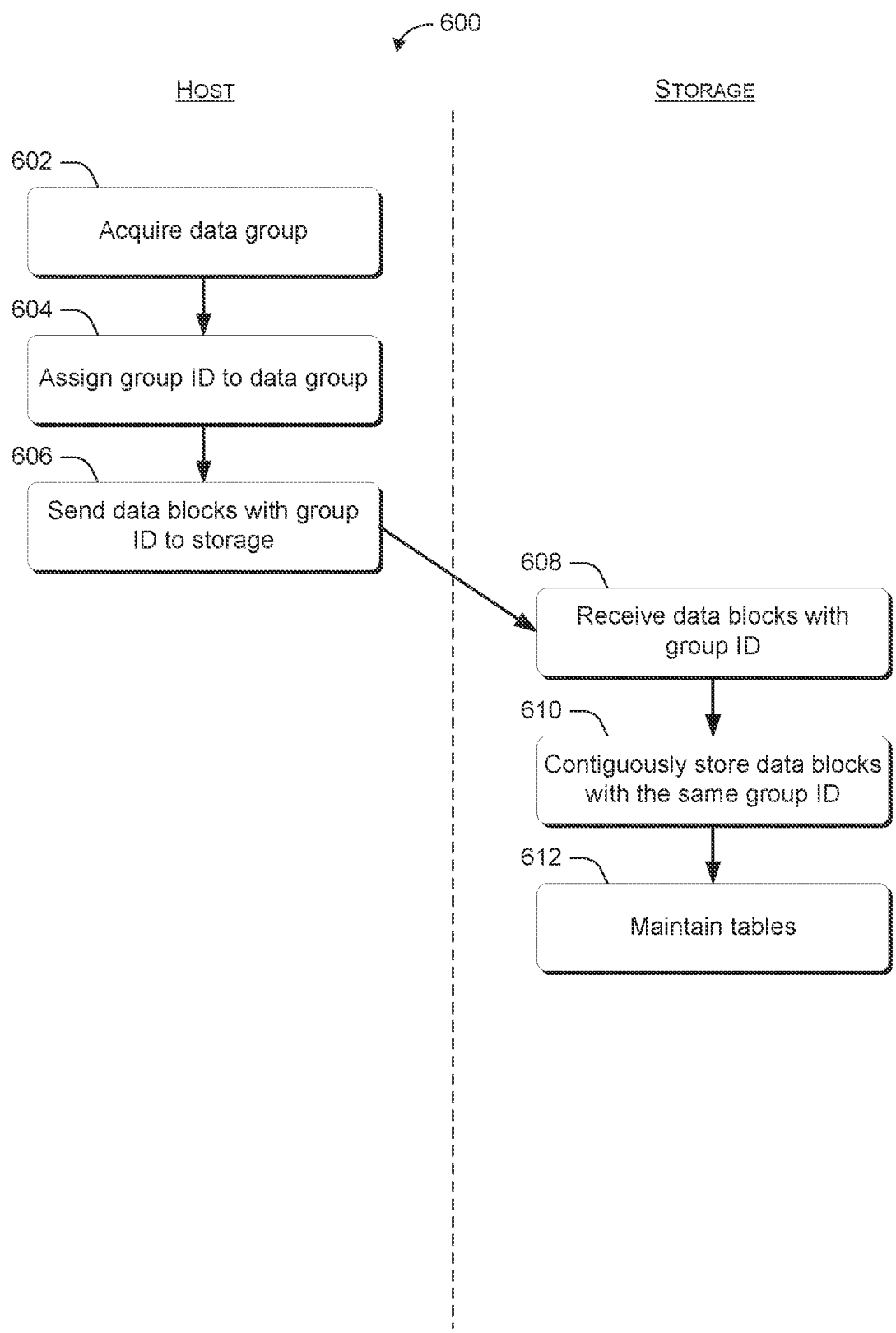
FIG. 6 illustrates an example storage method, consistent with some implementations of the present concepts.

FIG. 6 illustrates an example contiguous storage method 600, consistent with some implementations of the present concepts. The contiguous storage method 600 is presented for illustration purposes and is not meant to be exhaustive or limiting. The acts in the contiguous storage method 600 may be performed in the order presented, in a different order, or in parallel or simultaneously, may be omitted, and may include intermediary acts therebetween.

In one implementation, acts 602-606 may be performed by a host (e.g., a CPU running an OS), and acts 608-612 may be performed by a storage (e.g., a storage controller running firmware). However, in other implementations, these acts may be performed by different hardware and/or software components.

In act 602, a data group may be acquired. The data group may be a collection of data that is read from storage together, such that storing it contiguously would enhance read performance. For example, a region from a game container may be downloaded from a server via the Internet, an app may be obtained from an app store, or a suite of office applications may be copied from a DVD, etc.

In act 604, a group ID may be assigned to the data group. The group ID may be unique to the data group. For example, each game region may be assigned a unique group ID upon downloading. In one implementation, the data group may be acquired in act 602 in chunks, such as data blocks, and each data block may be tagged with the group ID. For example, each data block may be packaged or wrapped with metadata that includes the group ID. In one implementation, data groups may be assigned group IDs in sequential order initially (e.g., starting from zero or one and counting upwards). But, later, as different data groups are deleted and new data groups are added, non-sequential group IDs may be available for assignment to future data groups.

In act 606, the data blocks along with the group ID may be sent for storage. The data blocks that belong to the data group may be sent with the common group ID so that the data blocks would be stored contiguously on physical storage media. That is, consistent with the present concepts, the group IDs may be a mechanism for the host to tell the storage to contiguously store the data blocks together. Act 606 may also involve sending metadata either along with or separately from the data blocks. The metadata may include any information that can be used to manage the storage of the data blocks. For example, the metadata may include the group ID, the LBAs of the data blocks, the size of the data group, the maximum size and/or minimum size of the data group, the number of data blocks in the data group, the size of the data blocks, the sequential ordering of the data blocks, an indicator that the data group is new or an update, the number of data groups, and/or the sizes of other data groups, etc.

In act 608, the data blocks having the common group ID may be received for storage. For example, the data blocks that make up the downloaded region of the game container may be received for contiguous storage and faster read performance.

In act 610, the data blocks with the same group ID may be contiguously written in the storage media in the first instance, as opposed to writing the data blocks in a fragmented manner in the first instance and then performing a defragmentation task. That is, consistent with the present concepts, the data blocks may be written contiguously in a one-step writing process, rather than a two-step writing process that involves defragmenting.

Act 610 may involve searching the storage media for large enough contiguous free space to fit all the data blocks for the group ID based on the size of the data group that was received (e.g., in the metadata). As discussed above, in one implementation, the size of the free space allocated to the data group may be larger and include free space padding in addition to the size of the data group. The padding may allow for future updates that grow the size of the data group while still maintaining the contiguity of the updated data group. For instance, in one implementation, the storage controller may determine the size of the padding based on the metadata (e.g., the actual size, the maximum size, and/or the minimum size of the data group), a calculated percentage (e.g., 5% or 10%) of the actual size, the amount of total free space available, and/or any other factors.

If there is no contiguous free space available in the storage media that is large enough to fit the entire data group, then the data group may be stored with the least amount of fragmentation as possible (i.e., using the largest chunks of free space available). Alternatively, other data in the storage media may be moved around to create large enough contiguous free space to fit the data group without any fragmentation. For example, where the storage media includes an HDD, existing data already stored in the HDD may be shifted around to create sufficiently large contiguous free space to contiguously write the data group. That is, a defragmentation of the free space in the HDD may be performed. In this example of the HDD, the benefit of enhanced read speeds from storing the data group contiguously may outweigh the sacrifice in time taken to move the existing data. However, where the storage media includes an SSD, the existing data may be kept in place and the data group may be written to the largest chunks of free spaces in order to store the data group with the least degree of fragmentation. In this example of the SSD, the degradation in the lifespan of the SSD from moving existing data around may not outweigh the benefits of enhanced read speeds.

In act 612, tables may be maintained. One or more lookup tables may keep track of information regarding the data stored in the storage media. For example, the correspondence between the LBAs and the PBAs of the data blocks may be maintained in an L2P table. Consistent with some implementations of the present concepts, the correspondence between the group IDs and the ranges of contiguous PBAs may be maintained in a G2P table. This G2P table may be miniscule in size compared to a G2L table could be maintained to track the direct correspondence between the group IDs and the LBAs.

If an update to an existing data group is later received, then the G2P table and/or the L2P table may be referenced to identify the LBAs and/or the PBAs that correspond to the group ID associated with the updated data blocks. Accordingly, the updated data blocks may also be written contiguously with the old data blocks. If, however, there is not enough free space next to the old data blocks to write the new data blocks in a contiguous manner, then the old data blocks may be moved to another physical location with large enough free space to write the old data blocks and the new data blocks contiguously with each other. Where the storage media includes an SSD, the old data blocks in the previous physical location may be erased via a garbage collection process.

Applications

The present concept may have a wide range of applications in various fields of data management. Several implementations of the present concepts have been described above in the context of certain example data, such as games, applications, etc. However, the present concept may be used to write and/or update any types of data that could benefit from faster read speeds. Also, the above-described example implementations involved using SDDs and/or HDDs. However, the present concepts may be applied to any types of storage device, so long as contiguous storage and/or reduced number of write operations provides benefits, such as improved read performance and/or prolonged lifespan. For example, in one implementation, an OS of a host may be configured to contiguously write any kind of data using the present concepts.

Advantages

By enforcing contiguous writing of data groups in a one-step write operation, read latency can be decreased and defragmenting can be avoided. Fast read speeds may enhance user experience and thus can provide a competitive advantage in markets where high read speeds are crucial, for example, critical databases and high-end games. Furthermore, writing associated data blocks within one data group contiguously in one step may be faster than taking two steps to first write the data blocks fragmentarily and then later defragmenting the scattered data blocks.

Avoiding defragmentation tasks and thereby reducing the number of write operations may improve the longevity of storage devices. Furthermore, cheaper flash memory with lower endurance may be used in lieu of expensive flash memory with high endurance, because fewer write operations may be needed during the lifespan of the flash memory.

Moreover, a G2P table that is much smaller than an L2P table would allow faster lookup of LBAs associated with a particular group ID. The smaller G2P table would therefore enhance the performance of future data updates. Using the G2P table may avoid having to create and maintain a G2L table, which is very large, requires a significant amount of storage space, and consumes much longer lookup times.

Various examples are described above. Additional examples are described below. One example includes a system comprising a host including a processor configured to execute instructions to tag data blocks in a data group with a group identifier and send the data blocks tagged with the group identifier to a storage controller. The system also comprises a storage module including storage media and the storage controller configured to contiguously write the data blocks tagged with the group identifier in the storage media without performing a defragmentation.

Another example can include any of the above and/or below examples where the storage controller is further configured to maintain a group-to-physical table that includes correspondence between the group identifier and a range of contiguous physical block addresses of the data blocks.

Another example can include any of the above and/or below examples where the group-to-physical table includes one column for group identifiers and two columns for ranges of contiguous physical block addresses.

Another example can include any of the above and/or below examples where the group-to-physical table includes multiple row entries for multiple group identifiers.

Another example can include any of the above and/or below examples where the instructions further cause the processor to assign the group identifier to the data group.

Another example can include any of the above and/or below examples where the instructions further cause the processor to send a size of the data group to the storage controller.

Another example can include any of the above and/or below examples where the storage module includes a solid state drive module, and the storage media includes flash memory.

Another example can include any of the above and/or below examples where the data group includes a region in a game container.

Another example includes a storage device comprising storage media for storing data and a controller configured to receive data blocks that are associated with a group identifier and contiguously write the data blocks in the first instance in the storage media without fragmentation.

Another example can include any of the above and/or below examples where the controller is further configured to sequentially write the data blocks in the storage media.

Another example can include any of the above and/or below examples where the controller is further configured to maintain a group-to-physical table that includes correspondence between the group identifier and a range of contiguous physical block addresses where the data blocks are stored.

Another example can include any of the above and/or below examples where an entry in the group-to-physical table includes the group identifier, a starting physical block address of the range of contiguous physical block addresses, and a number of physical block addresses in the range of contiguous physical block addresses.

Another example can include any of the above and/or below examples where an entry in the group-to-physical table includes the group identifier, a starting physical block address of the range of contiguous physical block addresses, and an ending physical block address of the range of contiguous physical block addresses.

Another example can include any of the above and/or below examples where the controller is further configured to maintain a logical-to-physical table that includes correspondence between logical block addresses and physical block addresses of the data blocks and determine the logical block addresses that correspond with the group identifier by referencing the group-to-physical table and the logical-to-physical table.

Another example includes a computer-readable storage medium including computer-executable instructions which, when executed by a controller, cause the controller to receive a data group including data blocks that are tagged with a group identifier and contiguously write the data blocks in storage media in the first instance without defragmenting the data blocks.

Another example can include any of the above and/or below examples where the computer-executable instructions further cause the controller to receive sequencing information for the data blocks and sequentially write the data blocks in the storage media in the first instance.

Another example can include any of the above and/or below examples where the computer-executable instructions further cause the controller to receive a size of the data group and allocate free space of at least the size in the storage media for contiguously writing the data blocks.

Another example can include any of the above and/or below examples where the computer-executable instructions further cause the controller to add an entry in a group-to-physical table, the entry including the group identifier and a range of contiguous physical block addresses at which the data blocks are contiguously stored.

Another example can include any of the above and/or below examples where the computer-executable instructions further cause the controller to receive an update to the data group, the update including updated data blocks that are tagged with the group identifier and write the updated data blocks to be contiguous with the data blocks in the storage media without defragmenting the updated data blocks.

Another example can include any of the above and/or below examples where the computer-executable instructions further cause the controller to update an entry in a group-to-physical table for the data group by modifying a range of contiguous physical block addresses in the entry.

The invention claimed is:

1. A system comprising:
a host including a processor configured to execute instructions to:
tag data blocks in a data group with a group identifier; and
send the data blocks tagged with the group identifier to a storage controller; and
a storage module, including:
storage media; and
the storage controller configured to:
contiguously write the data blocks tagged with the group identifier in the storage media without performing a defragmentation;
maintain a group-to-physical table that includes correspondence between the group identifier and a range of contiguous physical block addresses of the data blocks;
maintain a logical-to-physical table that includes correspondence between logical block addresses and the physical block addresses of the data blocks; and
determine the logical block addresses that correspond with the group identifier by referencing the group-to-physical table and the logical-to-physical table.

2. The system of claim 1, wherein the group-to-physical table includes one column for group identifiers and two columns for ranges of contiguous physical block addresses.

3. The system of claim 1, wherein the group-to-physical table includes multiple row entries for multiple group identifiers.

4. The system of claim 1, wherein the instructions further cause the processor to assign the group identifier to the data group.

5. The system of claim 1, wherein the instructions further cause the processor to send a size of the data group to the storage controller.

6. The system of claim 1 wherein the storage module includes a solid state drive module, and the storage media includes flash memory.

7. The system of claim 1, wherein the data group includes a region in a game container.

8. A storage device, comprising:
storage media for storing data; and
a controller configured to:
receive data blocks that are associated with a group identifier;
contiguously write the data blocks in the first instance in the storage media without fragmentation;
maintain a group-to-physical table that includes correspondence between the group identifier and a range of contiguous physical block addresses where the data blocks are stored;
maintain a logical-to-physical table that includes correspondence between logical block addresses and the physical block addresses of the data blocks; and
determine the logical block addresses that correspond with the group identifier by referencing the group-to-physical table and the logical-to-physical table.

9. The storage device of claim 8, wherein the controller is further configured to sequentially write the data blocks in the storage media.

10. The storage device of claim 8, wherein an entry in the group-to-physical table includes the group identifier, a starting physical block address of the range of contiguous physical block addresses, and a number of physical block addresses in the range of contiguous physical block addresses.

11. The storage device of claim 8, wherein an entry in the group-to-physical table includes the group identifier, a starting physical block address of the range of contiguous physical block addresses, and an ending physical block address of the range of contiguous physical block addresses.

12. The storage device of claim 8, wherein the group identifier includes a Stream identifier in a non-volatile memory express (NVMe) protocol.

13. The storage device of claim 8, wherein the range of contiguous physical block addresses is identified by an ending physical block address.

14. The storage device of claim 8, wherein the range of contiguous physical block addresses is identified by a total number of physical block addresses.

15. A storage medium including computer-executable instructions which, when executed by a controller, cause the controller to:
   receive a data group including data blocks that are tagged with a group identifier;
   contiguously write the data blocks in storage media in the first instance without defragmenting the data blocks;
   maintain a group-to-physical table that includes correspondence between the group identifier and a range of contiguous physical block addresses where the data blocks are stored;
   maintain a logical-to-physical table that includes correspondence between logical block addresses and the physical block addresses of the data blocks; and
   determine the logical block addresses that correspond with the group identifier by referencing the group-to-physical table and the logical-to-physical table.

16. The storage medium of claim 15, wherein the computer-executable instructions further cause the controller to:
   receive sequencing information for the data blocks; and
   sequentially write the data blocks in the storage media in the first instance.

17. The storage medium of claim 15, wherein the computer-executable instructions further cause the controller to:
   receive a size of the data group; and
   allocate free space of at least the size in the storage media for contiguously writing the data blocks.

18. The storage medium of claim 15, wherein the computer-executable instructions further cause the controller to add an entry in the group-to-physical table, the entry including the group identifier and the range of contiguous physical block addresses at which the data blocks are contiguously stored.

19. The storage medium of claim 15, wherein the computer-executable instructions further cause the controller to:
   receive an update to the data group, the update including updated data blocks that are tagged with the group identifier; and
   write the updated data blocks to be contiguous with the data blocks in the storage media without defragmenting the updated data blocks.

20. The storage medium of claim 19, wherein the computer-executable instructions further cause the controller to update an entry in the group-to-physical table for the data group by modifying the range of contiguous physical block addresses in the entry.

* * * * *